United States Patent [19]
Thomas et al.

[11] 3,905,735
[45] Sept. 16, 1975

[54] STACK MOLDING APPARATUS

[75] Inventors: Douglas A. Thomas; Terry L. Stambaugh, both of Dayton, Ohio

[73] Assignee: General Motors Corporation, Detroit, Mich.

[22] Filed: Sept. 11, 1974

[21] Appl. No.: 505,166

Related U.S. Application Data
[62] Division of Ser. No. 401,882, Sept. 28, 1973.

[52] U.S. Cl. .......... 425/256; 425/338; 425/DIG. 54
[51] Int. Cl.² ..................... B30B 7/02; B30B 11/06
[58] Field of Search ...... 425/256, DIG. 54, 89, 253, 425/254, 338, 257

[56] References Cited
UNITED STATES PATENTS

| | | | |
|---|---|---|---|
| 1,346,158 | 7/1920 | Baily et al. | 425/DIG. 54 |
| 1,677,200 | 7/1928 | Oakley | 425/DIG. 54 |
| 2,873,475 | 2/1959 | Linhorst | 425/DIG. 54 |
| 2,943,347 | 7/1960 | Archibald | 425/DIG. 54 |
| 2,943,353 | 7/1960 | Fraula | 425/DIG. 54 |
| 3,107,141 | 10/1963 | Crafton | 425/338 X |
| 3,264,388 | 8/1966 | Roach | 425/DIG. 54 |

FOREIGN PATENTS OR APPLICATIONS

| | | | |
|---|---|---|---|
| 609,431 | 2/1935 | Germany | 425/DIG. 54 |

*Primary Examiner*—J. Howard Flint, Jr.
*Attorney, Agent, or Firm*—Peter P. Kozak

[57] ABSTRACT

Pressed articles such as brake linings are made by a stack molding apparatus and method. Measured charges of moldable material are sequentially placed on top of a vertical stack between spacer plates and compressed. When a predetermined number of charges have been made and compressed in the stack, a fully compressed article has formed at the bottom of the stack. The lowermost fully compressed charge is then removed while alternately a new charge of moldable material and spacer plate are added to the top of the stack in a continuous sequence.

4 Claims, 7 Drawing Figures

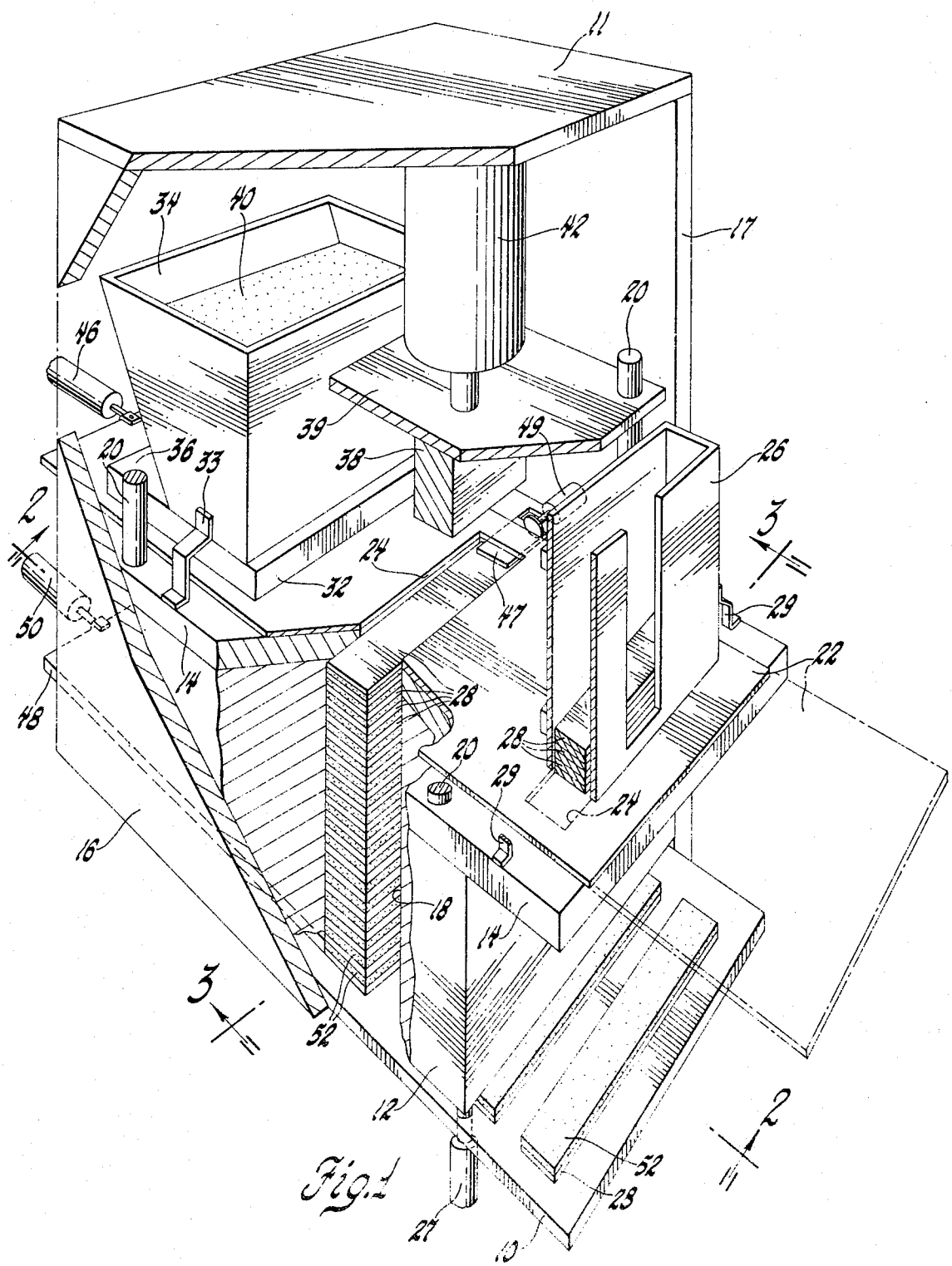

STACK MOLDING APPARATUS

This is a Division of U.S. Serial No. 401,882, filed September 28, 1973.

This invention relates to an apparatus for producing densified articles such as automotive brake linings from particulate materials in a stack press.

The conventional method of making brake linings for example involves preparing a moldable mixture comprising liquid or powdered resin binder, asbestos, a friction modifier such as cardolite particles and various friction fillers such as silica or potassium carbonate. The mixture is extruded into a slab about ½ inch thick and 17 inches wide, a suitable length of the slab is compacted between suitable plates from a specific gravity of about 1.3 in the extruded state to about 1.75 in its final state, and the slab is simultaneously heated to partially cure the resin binder and hence to form a self-sustaining shapeable slab. Thereafter, the slab is cut into a plurality of articles of suitable planar geometric shape and each article is then molded or shaped to a suitable three dimensional configuration for use as a brake lining. The linings are then fully cured whereby the shaped configuration is permanently retained.

The apparatus of this invention may use the same molding composition as the prior method described above. However, the articles are molded directly in a stack press, successively and continuously, so that the cutting of the slab into individual shapes of the prior art with the accompanying dust production is avoided, so that the waste incidental to sawing the slab into discrete shapes is avoided and whereby a superior product is produced due to better quality control and uniformity in the molding of each article.

SUMMARY OF THE INVENTION

Pressed articles such as brake linings are made in the stack apparatus according to the invention by a method in which a stack of predetermined height is formed in a vertical open ended mold cavity by depositing a measured charge of the particulate modable material in the cavity defined by vertical mold walls and a first spacer plate, placing another plate over the charge, subjecting the second plate to a predetermined pressure whereby the charge is initially and partially compressed between the first spacer plate and the second spacer plate, successively depositing additional charges of the moldable material and placing additional spacer plates over each of the charges and sequentially subjecting each uppermost plate to pressure so that each freshly added charge immediately underlying the uppermost plate is subjected to an initial compression and each charge underlying the other underlying plates is subjected to additional densifying pressure until the aforementioned stack is formed with the lowermost charge being sufficiently compressed to form the finally pressed article. The method is then continued in a continuous operation by successively and continuously removing the lowermost plate and the lowermost or finally pressed article from the base of the stack and depositing a further charge in the mold cavity over the uppermost plate, placing a plate over the last mentioned charge and subjecting the last mentioned plate to pressure whereby pressed articles are successively and continuously formed.

BRIEF DESCRIPTION OF THE DRAWINGS

Other objects and advantages of this invention will be apparent from the following description of the accompanying drawings in which:

FIG. 1 is a perspective view with parts broken away of a stack molding apparatus in accordance with the invention;

DESCRIPTION OF THE PREFERRED EMBODIMENTS

Figure 3:
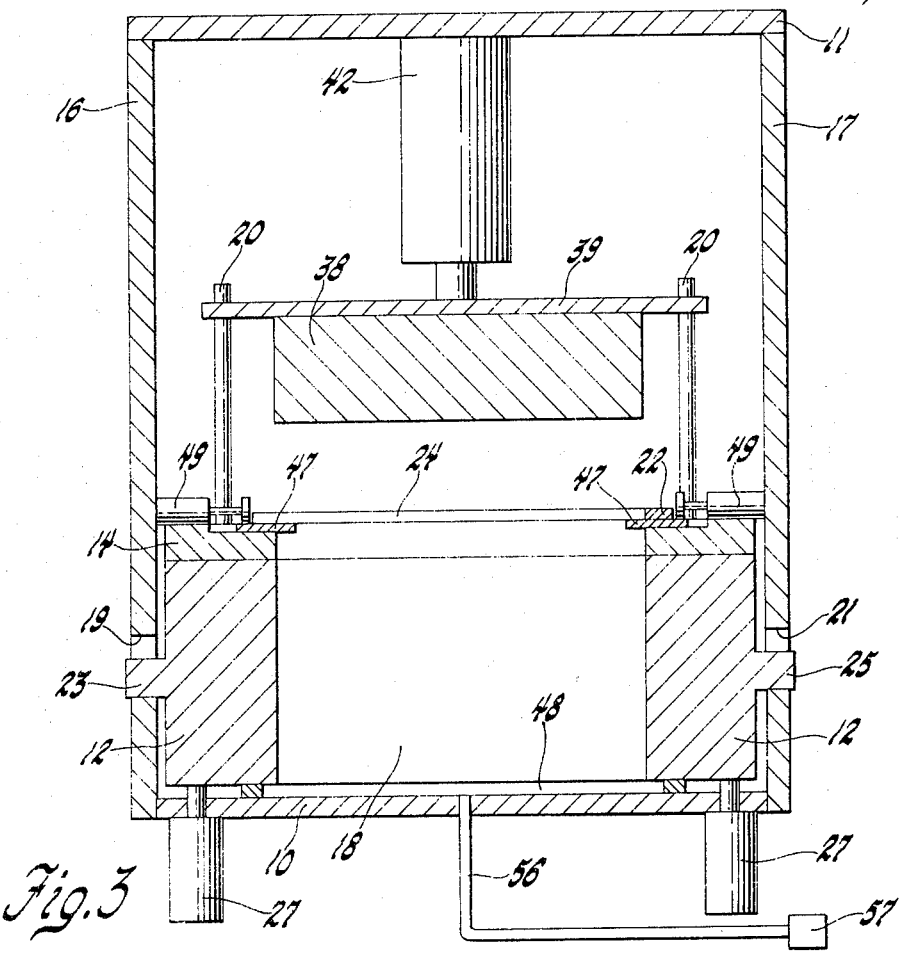
FIG. 3 is a cross-sectional view taken along line 3—3.

Referring to FIG. 1, the apparatus includes a base plate 10, a top plate 11 connected to the side walls 16 and 17 forming a basic box-like framework. Between the base plate 10 and top plate 11 is a horizontal plate or table 14 which has four vertical guide bars 20 fastened to the top thereof and a block 12 of die grade ferrous metal fastened to the bottom thereof. The table 14 together with the block 12 define the open ended cavity 18. As shown in FIG. 3, the table 14 and block 12 are normally supported by the base of the slots 19 and 21 of the walls 16 and 17 respectively and the lugs 23 and 25 of the block 12. It may be seen that table 14 and block 12 may be raised an amount permitted by the height of the slots 19 and 21 by means of the hydraulic cylinders 27 provided at each corner of the block 12 for reasons to be described hereinafter.

Mounted on the table 14 for transverse reciprocal movement is the movable plate 22. The movable plate 22 has a first opening 24 at one end thereof identical in size to the mold cavity 18. A chute 26 is mounted above the plate 22 and attached to the table 14 by means of the brackets 29 for carrying a plurality of spacer plates 28. These spacer plates are substantially identical in size to the opening 24 so that the spacer plates readily slip into the opening 24 when the opening 24 is moved into registry with the chute 26.

Figure 2:
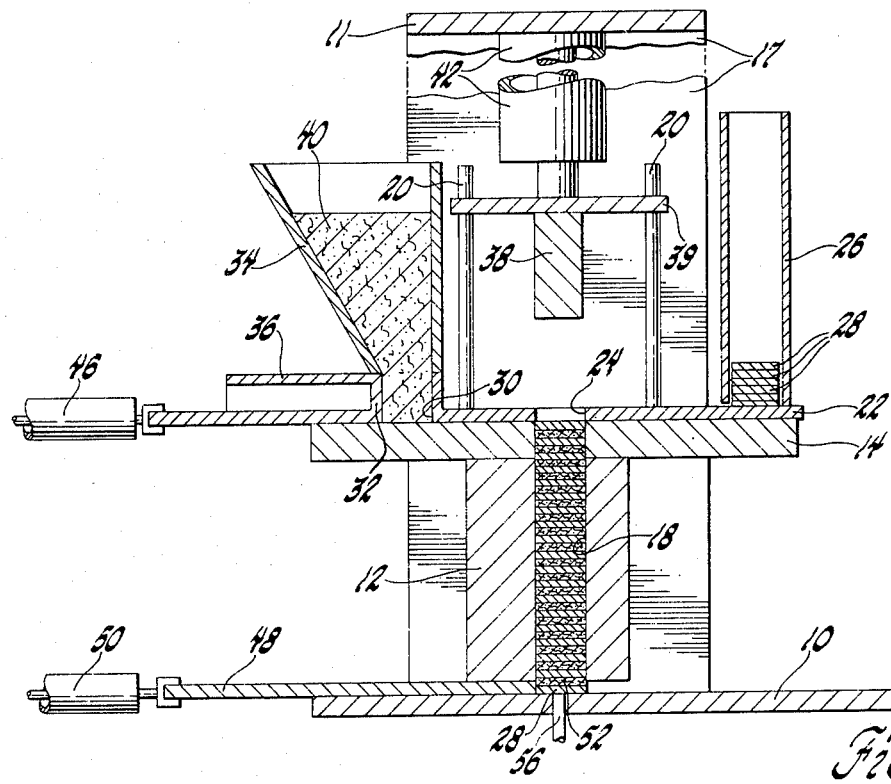
FIG. 2 is a cross-sectional view taken along line 2—2.

The movable plate 22 has at its opposite end a second opening 30 of a size substantially the same as the size of the cavity 18 as shown in FIG. 2. Attached to the plate 22 and about the second opening thereof is a vertical molding mix charging conduit portion 32 as shown in FIG. 2 having a platform 36 attached thereto. A hopper 34 is mounted on the table 14 by means of brackets 33 (FIG. 1) so that in one position of the movable plate 22 the opening 30 and metering conduit 32 are in alignment with the hopper 34 as shown in FIG. 2.

The apparatus also includes a ram or plunger 38 disposed in vertical alignment with the cavity 18 and mounted on the plate 39 which is maintained in vertical alignment by the guide rods 20 and is operated for vertical movement by the hydraulic cylinder 42 mounted on the cover plate 11.

Figure 5:
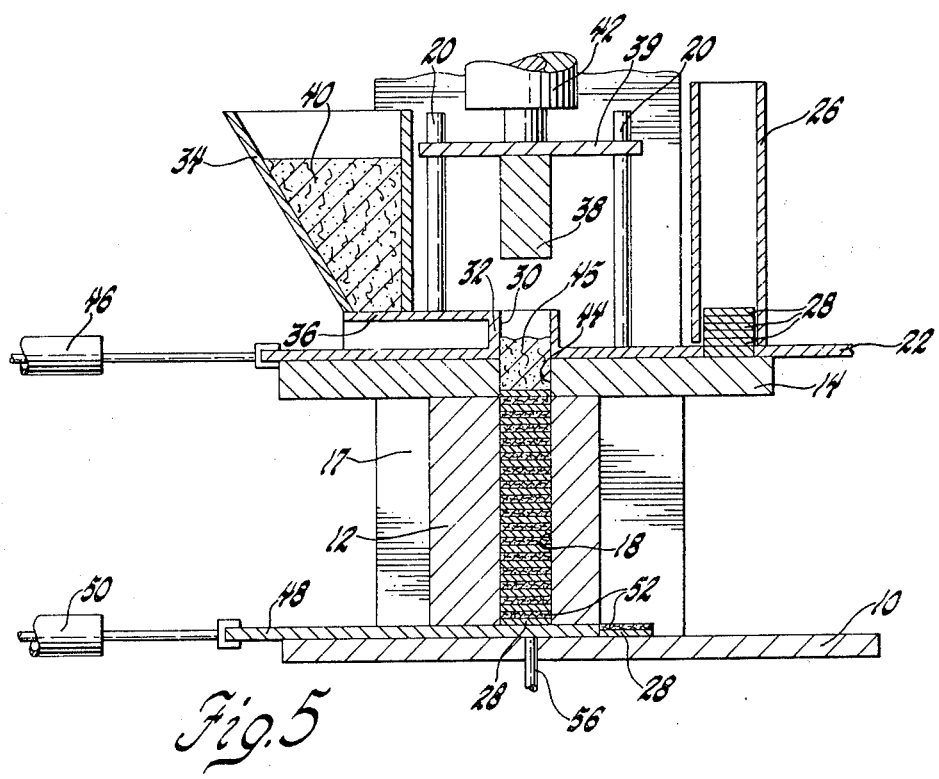

It may readily be seen by inspection of FIG. 2 that the movable plate 22 may be moved by means of the hydraulic cylinder 46 to a first position in which the opening 30 and the metering conduit portion 32 are disposed in registry with the hopper 34. In this position the opening 24 is in registry with the mold cavity 18. In a second position of the plate 22 as shown in FIG. 5, the opening 24 is in registry with the chute 26 wherein it may receive a spacer plate 28, and the opening 30 with the metering conduit portion 32 is in registry with the mold cavity 18. In this second position, it is noted that the hopper 34 is closed at the base thereof by the platform 36 attached to the metering conduit portion 32.

As previously indicated, the mold 12 is mounted in spaced relation to the base 10 and an ejector plate 48 is slidably mounted on the base 10 whereby it may be moved by means of the hydraulic cylinder 50 between a position short of the cavity 18 as shown in FIG. 2 to a position beneath the cavity 18 as shown in FIG. 5.

In accordance with the method of using the apparatus of this invention, a suitable particulate molding mix is prepared by any suitable means. To illustrate the invention in terms of the manufacture of brake linings for automotive application, a friction surface molding mix is prepared which comprises a mixture of about 15 to 20% by weight of a liquid or dry synthetic resin binder as, for example, phenylformaldehyde resin, 40 to 60% asbestos fibers, 20 to 30% friction modifiers such as cardolite particles and the balance friction fillers such as particulate silica or potassium carbonate. The materials are thoroughly mixed in a suitable mixer or blender and a suitable quantity 40 thereof is poured into the hopper 34.

Figure 4:
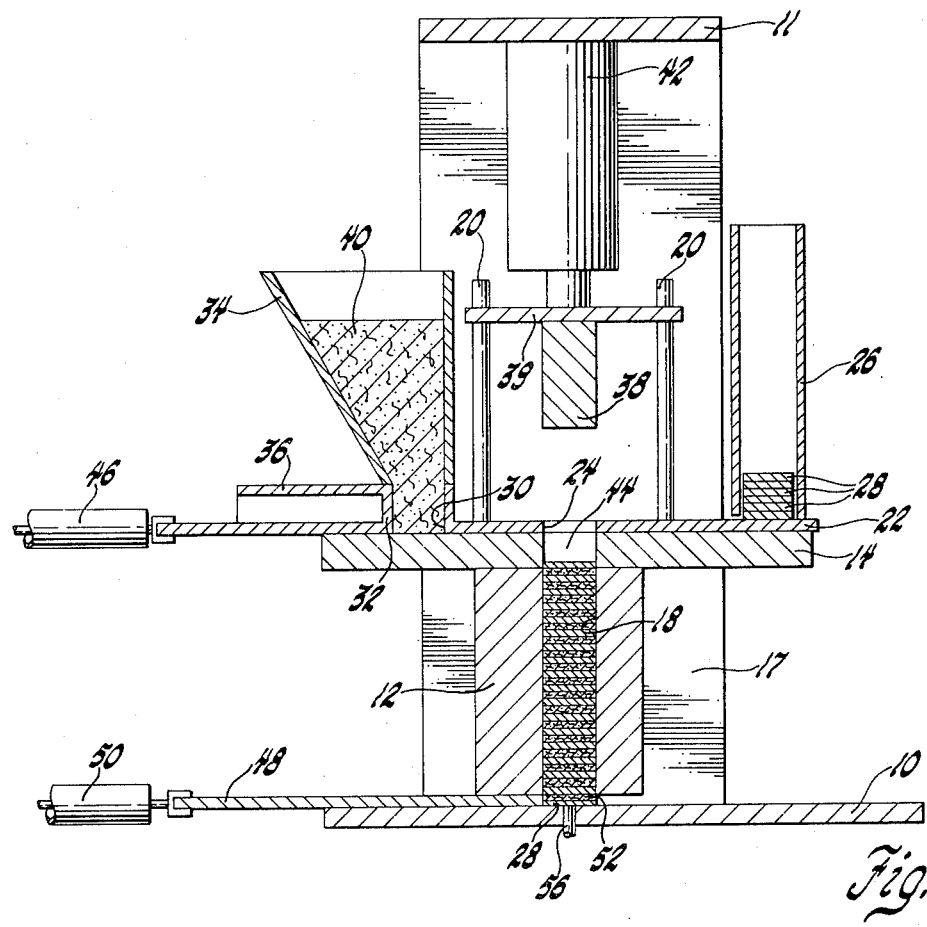
FIGS. 4 to 7 are cross-sectional views of the apparatus of FIG. 2 which illustrate several steps in the method of the invention.
Figure 6:
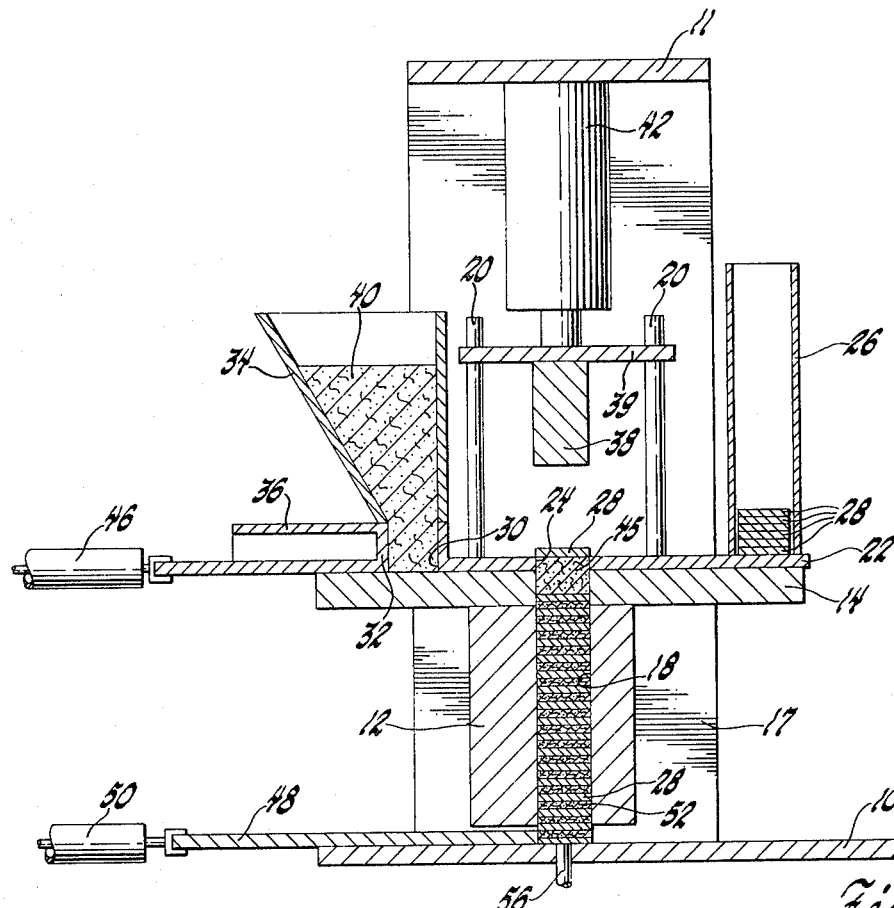
Figure 7:
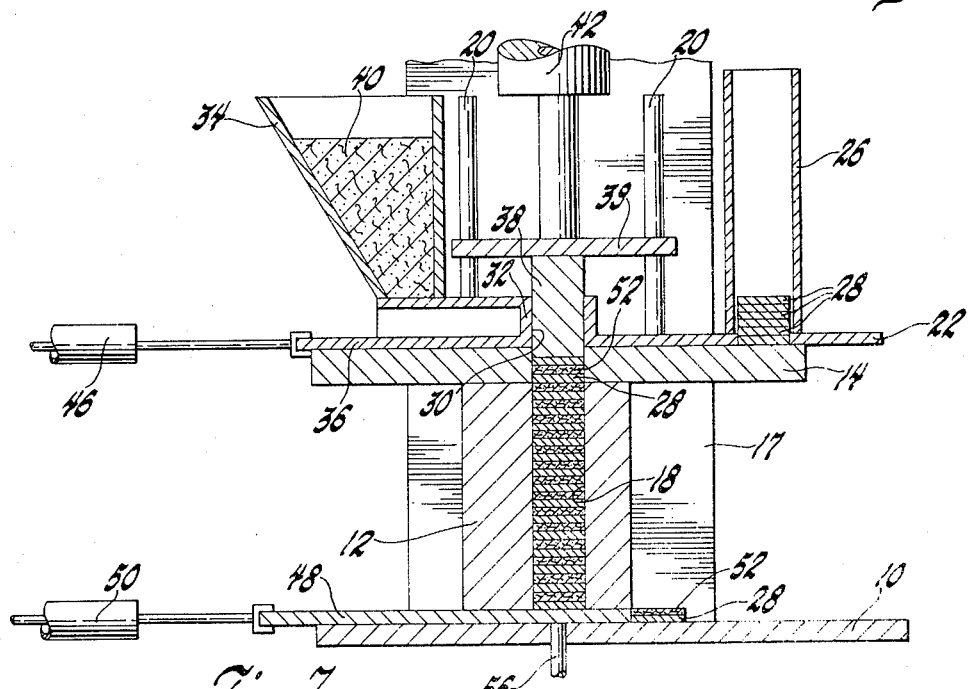

The cross-sectional contours of the cavity 18 is made in the shape of a brake lining. To start the stack molding process a stack of the spacer plates or previously made linings or a combination of these are inserted into the mold cavity 18 to form a stack as is shown in FIG. 4 which rests on the base plate 10 and extends upwardly into the cavity 18 sufficiently to provide cavity space 44 less than the volume of the metering conduit portion 32 plus the thickness of a spacer plate 28. Meanwhile, a suitable number of plates 28 are inserted into the chute 26. In the specific example described herein, spacer plates 28 which are ⅛ to ¼ inch thick may conveniently be used. The plate 22 is in the aforesaid first position in which the metering conduit 32 is in registry with the hopper 34 and accordingly is filled with the molding mix. The plate 22 is then moved to the right as shown in FIG. 5 to the aforesaid second position whereby the opening 30 is moved into registry with the cavity 18 thereby depositing a charge 45 of the molding mix as measured by the depth of cavity 18 into the cavity 18. Since the amount of mold mix in the conduit portion is more than the volume of the cavity 44 some mix is returned with the conduit 32 to the hopper 34 position. At the same time in this second position of the plate 22 the opening 24 has been moved underneath the chute 26 and has received a plate 28. Next, the movable plate 22 is moved to the left to the aforesaid first position whereby a spacer plate is positioned over the charge of the cavity 18 as shown in FIG. 6. Initially, the spacer plate is deposited on the retractable fingers 47 operated by the hydraulic cylinders 49 as shown in FIG. 3. The fingers 47 are then retracted whereby the fall of the spacer plate squarely into the charge cavity 44 is assured. The plunger 38 is then brought down with a force in the hydraulic cylinder 42 of about 1500 psi to initially compact the charge 45 into a liner 52. The plunger 38 is released and raised as soon as the pressure of 1500 psi is reached. Next, the hydraulic cylinders 27 beneath the mold block 12 are actuated to cause the block 12 to be raised slightly. The ejector bar 48 is then moved forward as shown in FIG. 7 to remove a spacer plate and liner from the base of the mold.

The above cycle is continued continuously which eventually results in the presence of 33 brake liners in the mold cavity. This number will vary depending on the thickness of the lining. The mold is heated so that in its traverse downwardly the liner is preferably partially cured to fully densify so that upon ejection of the molding apparatus it may be bent to a desired shape and thereafter fully cure whereby the final shape is permanently retained.

It has been found that as the liners move downwardly in the mold cavity, each charge is wedged against the mold wall so that pressure is constantly maintained on the underlying charges even though the pressure due to the action of the plunger 38 has been removed so that there is constant pressure being exerted on the charges throughout the molding cycle. Because of this wedging action it is necessary to raise the mold block 12 slightly after each compaction step as above described to free the lowermost liner sufficiently to permit its ejection by the ejector plate 48. In general, the stack molding process of this invention involves a reduction in volume at about a 10:1 ratio from the charge initially deposited in the mold cavity to the liner ejected at the base of the mold with the lining being about 0.325 inch in thickness.

In the embodiment specifically described above each compaction step is equal in intensity and each molding charge is subjected to the compaction force 33 times since the stack contains 33 charges or liners. However, due to the charges or liners being wedged against the mold cavity walls pressure is maintained on the liners throughout the sojourn of the liners through the stack. Specific gravity of the initial charge as deposited in the top of the stack is reduced from about 0.16 to 1.7 and the liners on ejection are in a semi-cured condition. In general, it has been found that the major portion of the compaction occurs in the initial five compactions. Preferably, the spacers 28 are coated with a suitable release agent such as Teflon so that they are easily separated from the liners when they emerge from the bottom of the mold. The spacers are then recycled through the mold.

As above indicated, the metering conduit 32 holds more than the cavity space 44. This gives the press a self-compensating feature. If the pieces are running thick, space 44 will have less volume causing subsequent pieces to be thinner and vice versa.

After ejection the liner may be bent or molded onto a suitable fixture in the shape of the brake liner as it is attached to a brake shoe for use with an automotive brake drum, and then fully cured in a suitable oven as is well known in the art.

In the preferred embodiment described above, the mold block 12 is heated to obtain a semi-cure during the sojourn time of the charges in the mold cavity. The curing rates may be varied or controlled by heating the upper portion of the block 12 and cooling the lower portion and also by varying cycle time. In some instances as, for example, in the case of a disc brake liner the full cure may be performed in the stack mold cavity since the disc liners may be used in a flat form. It is also within the scope of the invention to provide spacer plates which are curved or otherwise shaped to produce liners or other articles in the stack of other than a flat configuration.

In the preferred method as described above, the top of the stack is charged with a fresh charge of moldable material while simultaneously a fully compacted liner is ejected at the base and thereafter the plunger 38 compacts the stack and moves the stack downwardly upon the base plate 10 in a single ram movement. In another variation of this portion of the method, the compaction portion of the cycle may be divided into two strokes of the ram, the second lesser stroke being used to drive the stack to the base plate 10 once the ejector is pulled from under the stack and the first stronger stroke in the vicinity of 1500 lbs. psi being used to compact the liner materials with ejector under the stack. The latter variation is desirable if the lowermost liner tends to squeeze out from between the spacer plates if compacted below the mold cavity 18.

It will be readily apparent to those skilled in the art that the apparatus of this invention may be readily operated automatically by suitable hydraulic central and timer means. When operated automatically it is preferred to provide a pressurized tube 56 as shown in FIG. 3 which is associated with a pressure sensitive means 57 to monitor proper functioning of the apparatus. When the stack falls to the base plate 10, the tube 56 is closed. The pressure build-up indicates the stack has seated properly and the apparatus is ready for another cycle. If the stack fails to close the tube 56, the apparatus will stop.

While the invention has been described in terms of certain specific embodiments, it is to be understood that other forms may be adopted within the scope of this invention.

What is claimed is:

1. Stack molding apparatus for compaction of moldable particulate material comprising:
    a vertically disposed open ended mold supported in spaced relation to a base plate,
    first transfer means for depositing a measured charge of said particulate material to be compacted into the top of said vertical mold,
    second transfer means for depositing a separator plate into the top of said mold,
    vertically movable ram means positioned over the top of said mold,
    ejector means slidably positioned on said base plate movable between a first position removed from said mold and a second position beneath said mold,
    control means for sequentially causing said first transfer means to deposit a charge of said material into the top of said vertical mold, for causing said second transfer means to deposit a separator plate over said charge, for causing said ram to subject said separator plate to pressure and for causing said ejector means to eject the lowermost separator plate and the lowermost compacted article from said stack by a movement thereof from said first position to said second position.

2. Stack molding apparatus for compaction of moldable particulate material comprising:
    a vertically disposed open ended mold supported for slight vertical movement and in spaced relation to a base plate and means for raising said mold at least a slight amount,
    first transfer means for depositing a measured charge of said particulate material to be compacted into the top of said vertical mold,
    second transfer means for depositing a separator plate into the top of said mold,
    vertically movable ram means positioned over the top of said mold,
    ejector means slidably positioned on said base plate movable between a first position removed from said mold and a second position beneath said mold,
    control means for sequentially causing said first transfer means to deposit a charge of said material into the top of said vertical mold for causing said second transfer means to deposit a separator plate over said charge, for causing said ram to subject said separator plate to pressure, for causing said mold to be lifted slightly and for causing said ejector means to eject the lowermost separator plate and the lowermost compacted article from said stack by a movement thereof from said first position to said second position.

3. Stack molding apparatus for compaction of moldable particulate material comprising:
    a vertically disposed open ended mold supported for slight vertical movement and in spaced relation to a base plate and means for raising said mold at least a slight amount,
    first transfer means for depositing a measured charge of said particulate material to be compacted into the top of said vertical mold,
    second transfer means for depositing a separator plate into the top of said mold,
    vertically movable ram means positioned over the top of said mold,
    ejector means slidably positioned on said base plate movable between a first position removed from said mold and a second position beneath said mold,
    control means for sequentially causing said first transfer means to deposit a charge of said material into the top of said vertical mold for causing said second transfer means to deposit a separator plate over said charge, for causing said ram to subject said separator plate to pressure while said ejector means is in said second position, for causing said mold to be lifted slightly, and for causing said ejector means to eject the lowermost separator plate and compacted article from said stack.

4. Stack molding apparatus for compaction of moldable heat curable particulate material comprising:
    a heated vertically disposed open ended mold supported for slight vertical movement and in spaced relation to a base plate and means for raising said mold at least a slight amount,
    first transfer means for depositing a measured charge of said particulate material to be compacted into the top of said vertical mold,
    second transfer means for depositing a separator plate into the top of said mold,
    vertically movable ram means positioned over the top of said mold,
    ejector means slidably positioned on said base plate movable between a first position removed from said mold and a second position beneath said mold,
    control means for sequentially causing said first transfer means to deposit a charge of said material into the top of said vertical mold for causing said second transfer means to deposit a separator plate over said charge, for causing said ram to subject said separator plate to pressure, for causing said mold to be lifted slightly, and for causing said ejector means to eject the lowermost separator plate and at least partially cured compacted article from said stack by a movement thereof from said first position to said second position.

* * * * *